United States Patent [19]

Janczak et al.

[11] Patent Number: 5,124,045

[45] Date of Patent: * Jun. 23, 1992

[54] PERMANENT MAGNETIC POWER CELL SYSTEM FOR TREATING FUEL LINES FOR MORE EFFICIENT COMBUSTION AND LESS POLLUTION

[75] Inventors: Andrew Janczak, Massapequa, N.Y.; Edward Krensel, Philadelphia, Pa.

[73] Assignee: Enecon Corporation, Wantagh, N.Y.

[*] Notice: The portion of the term of this patent subsequent to Aug. 6, 2008 has been disclaimed.

[21] Appl. No.: 553,402

[22] Filed: Jul. 17, 1990

Related U.S. Application Data

[63] Continuation-in-part of Ser. No. 533,347, Jun. 5, 1990, Pat. No. 5,037,546.

[51] Int. Cl.$^5$ .............................................. F02M 27/04
[52] U.S. Cl. ................................. 210/695; 210/222; 123/538
[58] Field of Search ............... 210/222, 695; 123/536, 123/538; 335/304, 306

[56] References Cited

U.S. PATENT DOCUMENTS

| | | | |
|---|---|---|---|
| 3,116,726 | 1/1964 | Kwartz | 123/538 |
| 3,228,878 | 1/1966 | Moody | 210/222 |
| 3,989,017 | 11/1976 | Reece | 123/538 |
| 4,050,426 | 9/1977 | Sanderson | 123/538 |
| 4,265,746 | 5/1981 | Zimmerman, Sr. et al. | 210/222 |
| 4,367,143 | 1/1983 | Carpenter | 210/222 |
| 4,381,754 | 5/1983 | Heckel | 123/538 |
| 4,414,951 | 11/1983 | Saneto | 123/538 |
| 4,538,582 | 9/1985 | Wakuta | 123/538 |
| 4,572,145 | 2/1986 | Mitchell et al. | 123/538 |
| 4,605,498 | 8/1986 | Kulish | 210/222 |
| 4,808,306 | 2/1989 | Mitchell et al. | 123/538 |
| 4,865,730 | 9/1989 | Lam et al. | 123/538 |

Primary Examiner—W. Gary Jones
Assistant Examiner—Matthew O. Savage
Attorney, Agent, or Firm—Laurence R. Brown

[57] ABSTRACT

For disproportionately improving fuel combustion efficiency and decreasing pollutants produced in combustion the flow of fuel is treated in a fuel line preceding a combustion device by means of retrofit permanent magnetic structure. Thus, a high gauss permanent magnet unit, requiring no servicing or external power, mounts on the exterior surface of the fuel lines for establishing a flux path encompassing substantially the entire flow path. The flux is critically directed with a south magnetic pole in the downstream direction of fuel flow. Even more effectiveness results from mounting units in diametrically opposed pairs. The units have a pair of alnico magnetic plates straddling an arc on the pipe surface to focus the magnetic flux into a preferred pattern into the fluid flow path. By blending two permanent magnetic circuit paths from different permanent magnetic materials offering different advantages, a multi-pole, multi-axial magnetic flux generator uniquely distributes and concentrates the magnetic forces for maximum life while encountering vibration, shock and heat such as encountered when mounted on an automobile engine. Standard units fit different diameter fuel lines to provide very high fluid treatment flux concentrations over the entire fuel flow area and additionally have long life in the presence of magnetic interference or electrical shock.

14 Claims, 2 Drawing Sheets

PERMANENT MAGNETIC POWER CELL SYSTEM FOR TREATING FUEL LINES FOR MORE EFFICIENT COMBUSTION AND LESS POLLUTION

This is a continuation-in-part application of our co-pending application Ser. No. 07/533,347 filed Jun. 5, 1990 now U.S. Pat. No. 5,037,546.

TECHNICAL FIELD

This invention relates to the control of combustion and pollution by means of magnetic field processing of fuel lines at pre-combustion sites and more particularly it relates to permanent magnet units mountable as retrofit adapters outside a fuel line without disconnection or modification of the fuel or ignition system for producing magnetic flux in the flow path of combustible fuel within the pipe.

BACKGROUND ART

The role of magnetic flux in pre-ignition treating of combustible fuel to improve combustion efficiency and to reduce pollution is known in the art, as now briefly outlined with reference to U.S. patents. Thus, M. J. Kwartz; U.S. Pat. No. 3,116,726; Jan. 7, 1964 proposes an electromagnetic transformer disposed about a fuel line for periodic impulsing with sparking currents as an aid to combustion properties of the fuel when combined with a modification of the sparking action produced by the transformer. This system has the disadvantages of difficult installation in critical positions of a transformer which can only be installed over a disconnected fuel line in a position near a circuit breaker, not being adaptable to diesel engines or other combustion devices such as heaters and critical in operation, possible requiring different models for different car models. Also it is not clear that a distinct and measurable advantage in combustion efficiency results from the magnetic field, which is dynamic in nature and which may upon reversal of polarity undo any advantage achieved.

A further electromagnetic sparking arrangement in O. G. Reece; U.S. Pat. No. 3,989,017; Nov. 2, 1976 in addition deflects gaseous vapors into hot metal engine parts for heating to obtain better vaporization for combustion and reduction of pollution. It is subject to the same disadvantages as well as the critical necessity to heat the fuel. K. Heckel; U.S. Pat. No. 4,381,754; May 3, 1983 uses simply a battery operated solenoid about the fuel line. It is not clear that the fuel savings is greater than the considerable battery electrical power used for the solenoid.

Permanent magnets have been introduced, for example in C. H. Sanderson; U.S. Pat. No. 4,050,426; Sep. 27, 1977 positions a permanent magnet, actually a series of permanent magnets of alternating polarity internally axially in the fuel line and surrounded by a soft iron casing. This changes the fuel line characteristics, introduces turbulence and possibly bubbles interfering with the nature of fuel to be consumed, and is expensive and inconvenient to install as an accessory. Furthermore the alternating polarity magnetic fields have the propensity to reduce the net favorable effect of the magnetic treatment on the fuel flowing through the line. F. Saneto; U.S. Pat. No. 4,414,951; Nov. 15, 1983 uses a series of toroidal magnets of alternating polarity either about the fuel line or outside in two diametrically opposed positions. Another variation of this is found in J. Mitchell; U.S. Pat. No. 4,808,306; Feb. 28, 1989, using a single alternating poled permanent magnet outside the fuel line.

Single magnets positioned inside the fuel line for flow of fuel adjacent the magnetic poles are provided in K. Wakuta; U.S. Pat. No. 4,538,582; Sep. 3, 1985 and B. Lam, et al.; U.S. Pat. No. 4,865,730; Sep. 12, 1989. These devices are not adaptable to different sizes of fuel lines nor to simple installation without severing the fuel line. The former requires isolated north and south magnetic poles on both sides of the magnet to treat bifurcated fuel streams differently and oppositely, thus presumably cancelling out the net effects of the magnetic polarity. The latter has a bore in a generally rectangular magnet plate surrounding a cylindrical flow passageway with a soft iron armature adjacent the plate sides serving to shunt magnetic force lines away from the fuel flow passageway.

J. Mitchell; U.S. Pat. No. 4,572,145; Feb. 25, 1986 proposes to dispose a south pole adjacent one side of a fuel line in an exterior mount, which has the great advantage of adaptability to retrofitting as an accessory on various sizes of fuel lines. However, the magnetic flux distribution path cannot effectively and uniformly treat all the fuel flowing in the line uniformly and consistently so the efficiency of such a unit is quite small.

None of this art has been quantitatively shown to be effective and efficient in operation either to reduce pollution or to increase fuel burning efficiency. Most of the art is critical to install and operate, requiring tailor made fitting to particular models and fuel lines. Some of it requires external wiring and energy. None of the art effectively uses a magnetic field configuration in a manner that can adequately use the potential improvement possible with magnetic field treatment for either pollution minimization or fuel economy.

It is therefore an object of this invention to provide improved magnetic field treatment of fuel lines with an easy to install external permanent magnetic retrofit accessory requiring no energy and uncritical in positioning, but which more effectively treats fuel in a critically disposed magnetic field pattern that disproportionally reduces pollution with a corresponding increase in fuel efficiency. Other objects features and advantages of the invention will be found throughout the following description and accompanying drawings and claims.

DISCLOSURE OF THE INVENTION

This invention provides universal type permanent magnetic fuel line processing units adaptable to a range of different fuel line sizes, which may be retrofit substantially instantaneously at existing fuel line locations, even in cramped quarters. The units provide improved high flux concentration within the entire fuel line working space area, not generally feasible with prior art units. Thus, by means of separated pole pairs in each unit of very high gauss alnico permanent magnets straddling the fuel line, the flux may be focussed over a preferred pattern of flux distribution within the fuel line to assure substantially complete coverage of the cross section area of fuel flow within the line at all times with a high density magnetic flux field.

Long life and adaptability to conditions where vibration, shock, heat and electrical interference are present is improved by means of two shunt permanent magnetic paths acting in unison. Thus, an auxiliary path of ceramic ferrite permanent magnet material serves as a reservoir for the high gauss alnico flux field to prevent its discharge in the presence of sporadic vibration, shock, or engine heat, and an assurance of an acceptably high maintenance flux over a long life period.

The units have been installed without other fuel line or ignition adjustments to treat vehicles failing required emission tests as an inexpensive retrofit accessory to give substantially immediate improvements of up to the order of 80% reduction in hydrocarbon and carbon monoxide emissions.

Other features, advantages and objects of the invention will be found throughout the following description, claims and accompanying drawings.

BRIEF DESCRIPTION OF THE DRAWINGS

Like reference characters are used to identify similar features for facilitating comparison throughout the several views of the drawing, in which.

THE PREFERRED EMBODIMENTS

Figure 1:
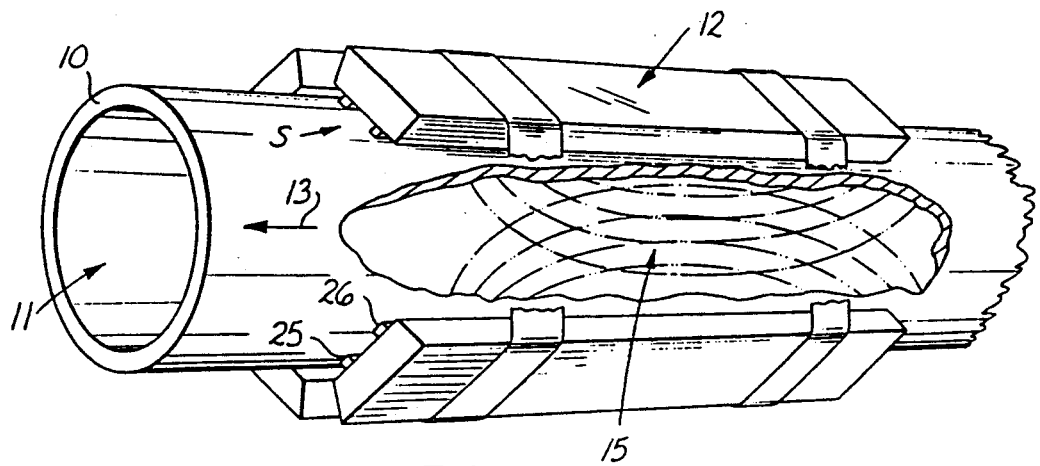
FIG. 1 is a perspective fragmental view, partly broken away, of a typical fuel line embodiment illustrating the operation of the invention.

As may be seen from FIG. 1, the fuel line 10, or other fluid flow pipe, has a fluid flow therein in the direction of arrow 13. This may represent an industrial or home fuel line leading to a combustion device such as a burner or an automotive fuel line to a carburetor or injection system and is located in the vicinity of and preceding the fuel atomizer. A plurality of two (or more in the case of larger pipes) diametrically opposed corrosion treatment matched pair magnetic units 12 preferably are arranged about the outer circumference of the fuel line 10 for generation of a magnetic flux pattern 15 in the fluid flow path, depending upon the size of the pipe. Each unit 12 is adapted to rest on or adjacent to the outer pipe circumference or wrapping for creating a longitudinally oriented magnetic flux pattern 15 along a length of the fluid flow path in the fuel line 10. The only critical requirements are that the fuel line 10 be plastic, brass or other non-magnetic material so that no shunting path will keep the magnetic flux 15 from penetrating into the fuel flow path 11 and that the south magnetic pole of the flux is oriented downstream in the fuel flow path. A flux pattern that substantially saturates the entire fluid flow cross section inside the fuel line with magnetic flux installed near the carburetor or injection system of most vehicles is achieved with two diametrically opposed units 12.

Note that these single units 12 of a standard size have a wide range of adaptability to different fuel line sizes so that they do not have to be custom fit to different fuel line sizes. Preferably an even number of units are arranged in diametrically opposed pairs with the individual units spaced equally apart on the outer circumference. A typical size for these units adapted for fuel line use is about two inches (5 cm) long and about one half inch (1.25 cm) wide. The south pole S is marked for orientation downstream in the flow path 13. That is critical, since it has been found that the opposite orientation will reduce gas mileage and increase pollution. Thus, any magnetic field influences of opposite polarity in the vicinity of the installation or between it and the combustion site should be avoided.

Figure 2:
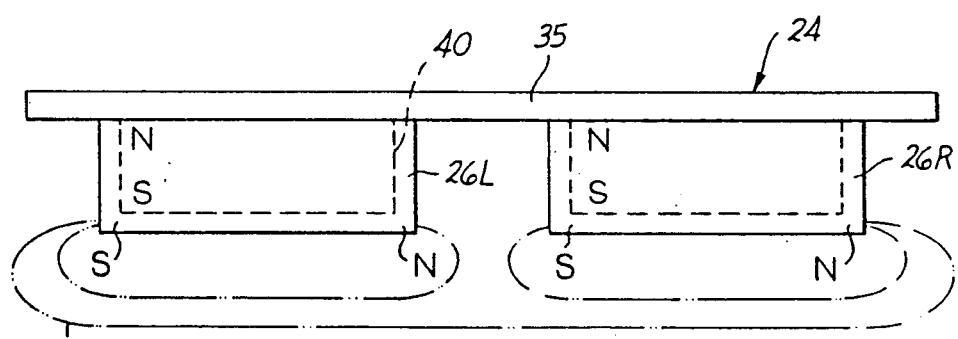
FIG. 2 is a side view of a double tiered flux treatment unit embodiment of the invention, FIG. 3 an end view, and FIG. 4 a bottom view of a single unit.
Figure 3:
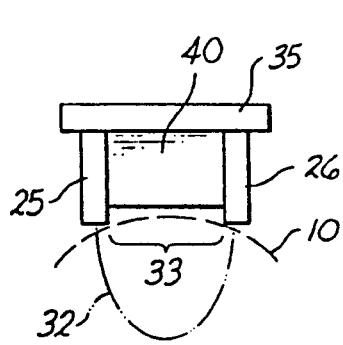
Figure 4:
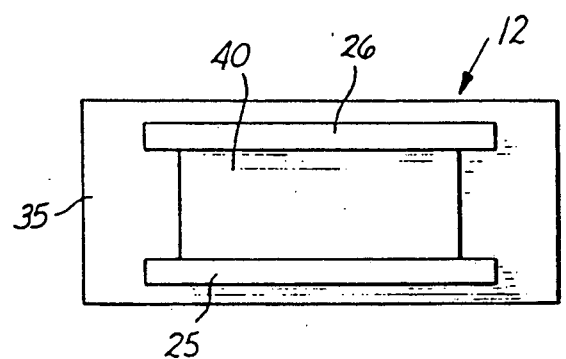

As may be seen from FIGS. 2 and 4, the assembly may be a single unit 12 (FIG. 4) or a pair of longitudinally cascaded units 24 (FIG. 1). The latter dual unit is preferable whenever any turbulence is possible in the flow path to assure that the fluid flows the full available length through a significant length of the available flux pattern for treatment. Note that the dual unit produces a unitary fuel line penetrating flux pattern 30 of the same polarity that is produced in a single unit.

The units 12 or assemblies 24 are made up of suitably packaged magnetic arrays having two spaced substantially rectangular alnico magnetic plates 25, 26 extended as legs for contact with the outer circumference of the fuel line 10, straddling the arc 33 and serving to focus the very high gauss magnetic flux 30 in a rather sectorial pattern 32 extending between poles of magnets 25 and 26 and encompassing a significant part of the cross section area of the fluid flow path within the pipe 10. The small diameter of a fuel line permits a pair of units diametrically opposed to substantially saturate the fuel flow path within the line so that little untreated fuel may pass that could cause the pollution and reduced gas mileage of untreated fuel flow.

The low reluctance soft iron or equivalent non-permanent magnetic cover plate 35 serves as a return path for the longitudinally oriented alnico magnet poles (N, S), at the upper side of the magnets 25, 26. Accordingly at the lower side, the flux pattern 30 is established for intrusion within the fuel line 10.

One substantially cubic ceramic ferrite permanent magnet 40, 41 is normally disposed between the alnico magnets 25, 26 and in contact with the low reluctance cover plate 35, to leave the alnico legs for straddling the fuel line 10 extending from the bottom, as shown.

Figure 5:
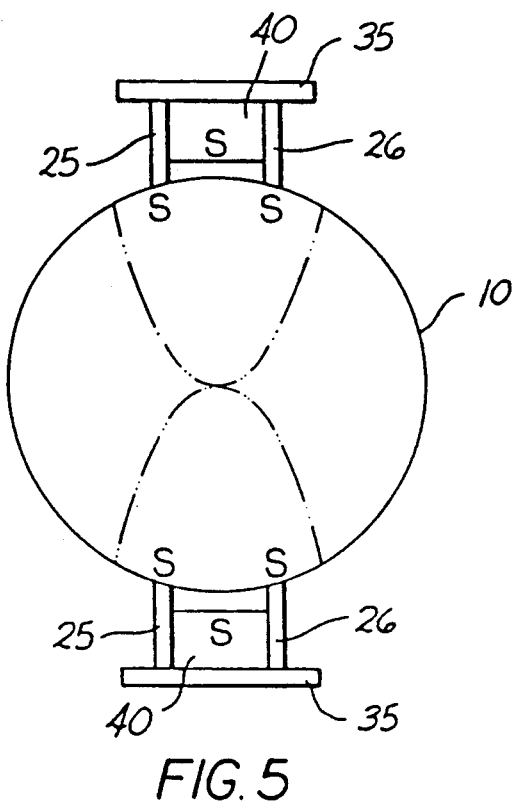
FIGS. 5 and 6 are respectively end view and side view section sketches of one pair of units diametrically opposed on opposite sides of a fuel line illustrating typical flux patterns.
Figure 6:
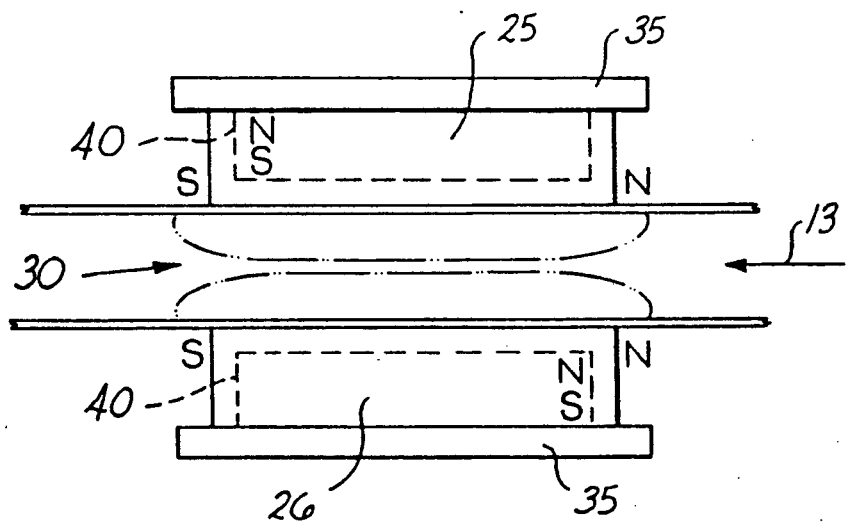

The cooperative relationship of the assemblies is better seen from FIGS. 5 and 6. In FIG. 5, the diametrically opposed preferable disposition of two units, as disposed upon a large pipe 10, is illustrated. Thus the repellant reaction of magnetic flux lines from the respective units near the center of the pipe 50 flattens out the normally shaped flux path in each unit to give a wider area of flux concentration thereby to provide a better distribution of flux over a larger cross section of the fluid flow path.

In FIG. 6, it is readily seen that the magnetic circuit 40, 35 formed by the ceramic ferrite permanent magnet shunts the magnetic circuit formed by the alnico magnets 25, 26. This serves several purposes. For one thing, there is a preferred defined outer radial (as seen from the pipe) stray flux path defined to reduce external fields, and to concentrate any stray flux longitudinally oriented to the pipe from the alnico north and south poles to penetrate the fluid flow path. For another two different kinds of magnets may be used for their preferred characteristics. The alnico magnets provide higher gauss magnetic fields. The ceramic magnets provide longer life in the presence of shock vibration and strong stray external magnetic fields. Thus, longer term life is assured than with the sole use of alnico magnets. In essence the cooperative effort is such that upon a sharp impact or strong electrical current from a lightning bolt, for example, that tended to shock the alnico magnets, the shunted ceramic magnets serve as a temporary storage reservoir resisting the demagnetization of the alnico magnets. Accordingly even when subjected to the heat and shock expected during operation with an automobile engine environment, for example, the disclosed combination of magnetic elements provides considerable advantage in the task of controlling pollution and increasing fuel efficiency.

It is seen, therefore, that the novel magnetic units afforded by this invention provide longer life, higher magnetic flux concentrations, larger effective treatment areas and adaptability of a standard unit to different fuel line sizes. In operation, the decrease of pollutants effected by the more efficient burning of the fuel achieved by the simple step of retrofitting the magnetic units of this invention about the fuel line near the fuel vaporization site is exemplified by the following example of an automobile tested in a licensed inspection station and providing an improved method of treating automobile engines for achieving required emission standards after failure.

EXAMPLE I

A 1984 Nissan 300Z with 90,000 miles was emission tested in a station licensed by the State of Pennsylvania with hydrocarbon emissions at 440 ppm, failing the limit of 220 ppm permissible. Similarly the carbon monoxide emissions tested at 1.88% failing the limit of 1.2%. Carbon dioxide level was 11.6%, a showing of the efficiency of burning fuel.

The units of this invention were installed on the vehicle, and it was driven about three miles before re-testing at the same inspection station with very substantial improvements of fuel efficiency and reduction of pollution. The hydrocarbon emissions were reduced to 87 ppm, a reduction of 80%. The carbon monoxide emissions were reduced to 0.31%, a reduction of 84%. The carbon dioxide increased to 15.3% showing more complete burning of fuel, which is a quantitative measure of better engine efficiency.

It is evident from these figures that the critical relationship of the magnetic flux in the fuel line produced by the units afforded by this invention result in an unobvious and unexpected reduction in pollution magnitude and fuel burning efficiency.

It was further established that reversal of the magnetic polarity, namely by changing the direction of flow 13 in FIGS. 1 and 6, worsened the pollutants and decreased fuel burning efficiency. Thus one significant factor that contributes to the improvements afforded by this invention is the polarity of the flux pattern longitudinally disposed along the flow path axis. Other significant factors, over the long range use of the units, is the safety and longevity afforded by the magnetic structure. It is also significant that the distribution of the flux in the flow path substantially completely treats the entire flow of fuel. Thus, the structure and operational performance of the present invention has unexpectedly improved and made possible the correction of excessive pollutant emission of an automobile by the simple step of installing a magnetic unit of this invention on the fuel line.

Thus, a rapid cure retrofit accessory is provided by this invention enabling the repair of an automobile to meet pollution standards after failure without requiring ignition or engine repairs or any alteration of any fuel line connections or couplings.

EXAMPLE II

The characteristic magnetic properties of a preferred embodiment of the magnetic units are as follows:
For the alnico magnetic flux control members:
  Residual induction—12,300 gauss
  Coercive force—640 oersteds
For magneto-ceramic ferrite shunting magnets:
  Residual induction—4,000 gauss
  Coercive force—2,900 oersteds

EXAMPLE III

A 1986 Chevrolet Van with 11,000 miles was tested at a Pennsylvania emission testing station for hydrocarbon emission with the following results:
Initial test—Hydrocarbons 208 ppm (220 passing);
With the aforesaid magnetic flux unit—127 ppm (38% decrease);
With magnetic flux direction reversed—630 ppm.

EXAMPLE IV

A series of comparative tests, all taken at a recently calibrated emission test system for the State of Pennsylvania on a 1984 Datsun 300Z with 90,000 miles, follow:

| Test #1 | Car without fuel line magnet | | | |
|---|---|---|---|---|
| Idle Test: | CO 1.79% | HC 344 PPM | $CO_2$ 13.1% | RPM 824 |
| Cruise Test | CO 2.47% | HC 224 PPM | $CO_2$ 12.7% | RPM 2075 |
| Test #2 | With diametrically opposed matched ceramic prior art magnet set commercially available with magnets disposed along length of fuel line--not polarized for direction--apparently symmetricul in either direction: | | | |
| Idle Test: | CO 2.60% | HC 373 PPM | $CO_2$ 12.4% | RPM 861 |
| Cruise Test: | CO 1.78% | HC 191 PPM | $CO_2$ 12.8% | RPM 2139 |
| Test #3 | With diametrically opposed magnets with south pole directed into fuel line (commercially available unit): | | | |
| Idle Test: | CO 1.79% | HC 349 PPM | $CO_2$ 12.8% | RPM 861 |
| Cruise Test: | CO 0.77% | HC 113 PPM | $CO_2$ 13.0% | RPM 2334 |
| Test #4 | With no magnetics to clear system for reference: | | | |
| Idle Test: | CO 2.08% | HC 344 PPM | $CO_2$ 12.7% | RPM 834 |
| Cruise Test: | CO 0.78% | HC 178 PPM | $CO_2$ 12.8% | RPM 2050 |
| Test #5 | With magnetic system of this invention south pole downstream: | | | |
| Idle Test: | CO 0.03% | HC 28 PPM | $CO_2$ 13.6% | RPM 815 |
| Cruise Test: | CO 0.01% | HC 14 PPM | $CO_2$ 13.6% | RPM 2073 |
| Test #6 | With magnetic system of this invention south pole upstream: | | | |
| Idle Test: | CO 0.03% | HC 126 PPM | $CO_2$ 13.9% | RPM 858 |
| Cruise Test: | CO 0.05% | HC 33 PPM | $CO_2$ 13.7% | RPM 2271 |

It is clear from the foregoing examples that this invention has produced a disproportionately more effective magnetic flux pollution control device that permits automobiles failing emission test standards to be "repaired" without any engine or ignition repairs by a retrofit mount of an accessory without any interruption of fuel lines or any complicated tools or installation procedures.

Having therefore advanced the state of the art, those novel features descriptive of the nature and spirit of the invention are set forth with particularity in the following claims.

We claim:

1. Apparatus for improving combustion efficiency and reducing combustion pollutants, comprising in combination, a permanent magnetic unit disposed in a position adjacent the exterior surface of a fuel line for carrying fuel into a combustion device, and magnetic structure in said unit including two parallel spaced longitudinally disposed magnetic plate means located parallel to a longitudinal axis of the fuel line and substantially contacting said exterior surface of the fuel line along the length of said unit for producing magnetic flux lines along a longitudinal portion of the fuel line with both plates having magnetized south poles disposed at one longitudinal end and north poles at an opposite longitudinal end and placed with the magnetic south poles downstream in the direction of fuel flow, and means for maintaining a spacing between said magnetic plate means for supplying a magnitude of magnetization substantially fully permeating the fuel flow path through the length of the plate means along the fuel line with sufficient magnitude of residual induction to substantially reduce hydrocarbon and CO pollutants produced by fuel combustion in the combustion device.

2. The apparatus of claim 1 wherein said magnetic plate means comprises alnico permanent magnets for producing said magnetic polarity and further comprising at least one ceramic permanent magnet shunted between said plates with the south pole disposed toward the fuel line for producing therewith supplemental magnetic flux to produce in the fuel flow path a combined flux from the alnico and the ceramic magnets of said magnitude of residual induction for magnetically treating fuel within the fuel line.

3. The apparatus of claim 1 wherein said magnetic plate means comprises a pair of alnico permanent magnets for producing said magnetic flux polarity, said magnetic unit being disposed on said fuel line with the individual magnetic plates straddling the fuel line over an arc thereon.

4. The apparatus of claim 3 having a matching second magnetic unit disposed on the exterior surface of the fuel line in a position diametrically opposite the position of the first said unit.

5. In a dynamic magnetic fluid fuel flow treatment system for controlling pollution in a combustion device receiving fuel along a fuel flow path within a fuel line delivering fuel thereto a permanent magnetic cell accessory positioned adjacent to an exterior surface of the fuel line to produce in the fuel flow path a magnetic flux pattern comprising:

permanent magnetic structure means comprising two substantially parallel spaced magnetic plates oriented parallel to a longitudinal axis of said fuel line and contacting the exterior surface of the fuel line along a length of the fuel line for producing within the fuel flow path a residual resultant magnetic flux pattern longitudinally directed along the fuel flow path with the magnetic pates having south poles directed downstream for the flow of fuel and said magnetic plates being of a magnetic strength sufficient to treat fuel so that it substantially reduces CO and hydrocarbon pollutants resulting from combustion of fuel in the combustion device.

6. Permanent magnetic structure means as defined in claim 5 wherein the magnetic plates further comprise:

alnico permanent magnet plate members producing a residual induction of about 12,000 gauss.

7. Permanent magnetic structure means as defined in claim 6 further comprising:

an adjoining ceramic ferrite permanent magnet positioned near each magnetic pole of and between the alnico plate members to extend substantially perpendicular therebetween with the south magnetic pole positioned adjacent the exterior surface of the fuel line, and a low reluctance not permanently magnetizable magnetic circuit plate member adjacent to and spanning the two alnico plate members and disposed longitudinally to extend between the magnetic north and south poles of the alnico magnet members and adjacent the north magnetic pole of the two ferrite permanent magnets, all assembled as a single unit with the two alnico plate members providing a pair of extending legs for straddling an arc on a cylindrical fuel line pipe to induce inside the fuel line a generally longitudinally oriented magnetic flux pattern encompassing substantially the area through which the fluid flows.

8. Permanent magnetic structure means as defined in claim 5 further comprising alnico permanent magnetic plates for producing said residual magnetic flux and a ceramic permanent magnet shunted between the alnico plates with the south magnetic poles adjacent said exterior surface for producing therewith supplemental magnetic flux for producing in said fuel flow path a combined flux from the alnico and the ceramic magnets of said strength sufficient to treat the fuel.

9. Magnetic means for magnetic treatment of fuel flow to reduce CO and hydrocarbon emission in combination with an automobile fuel flow line with the south pole downstream comprising in combination, a pair of permanent magnet plates held in parallel spacing and located parallel to a longitudinal axis of the fuel line to straddle an arc on an exterior surface of the fuel line substantially in contact with the fuel line surface with opposite magnetic poles placed to span a longitudinally disposed pipe section thereby as a unit to direct a longitudinally disposed magnetic flux pattern into the fuel line which encompasses a substantially sector shaped cross section of the area extending between the two plates within the fuel line.

10. The magnetic means of claim 9 said magnet plates further comprising substantially rectangular alnico plates, and a low reluctance non permanent magnetic plate bridging the permanent magnet plates at a position radially external to the fuel line surface to extend the magnetic plates therefrom as legs for straddling said arc.

11. The magnetic means of claim 10 further comprising, a pair of permanent magnet ceramic ferrite blocks disposed at opposite longitudinal ends between the rectangular plates with north poles adjacent the low reluctance bridging plate, and with south poles adjacent said exterior surface.

12. The magnetic means of claim 11 wherein the alnico plate magnets supply a residual magnetic induction of about 12,000 gauss and the ceramic ferrite blocks supply a residual magnetic induction of about 4,000 gauss.

13. The magnetic means of claim 9 wherein said magnet plates comprise alnico magnets.

14. The method of introducing magnetic flux in a single direction along with fluid flow of an ionizable fluid along a fuel flow path through a substantially cylindrical fuel line to reduce pollutants formed in a combustion device coupled to said fuel line, comprising the steps of disposing a magnetic flux producing device comprising two parallel spaced magnetic plates substantially in contact with an exterior surface of the fuel line and parallel therewith to span a predetermined length of the fuel line, aligning magnetic poles of the magnetic structure longitudinally in a direction of flow of fluid through the fuel line to present the dominant flux polarized in said flow path with south poles extending in the direction of the flow path and north poles extending upstream of the fluid flow, and further magnets disposed between the plates with south poles directing the flux toward said exterior surface into the interior of the fuel line whereby the fuel flow path is magnetically treated over substantially the entire length of flow of fluid in said fuel line along the magnetic plates.

* * * * *